No. 755,678. Patented March 29, 1904.

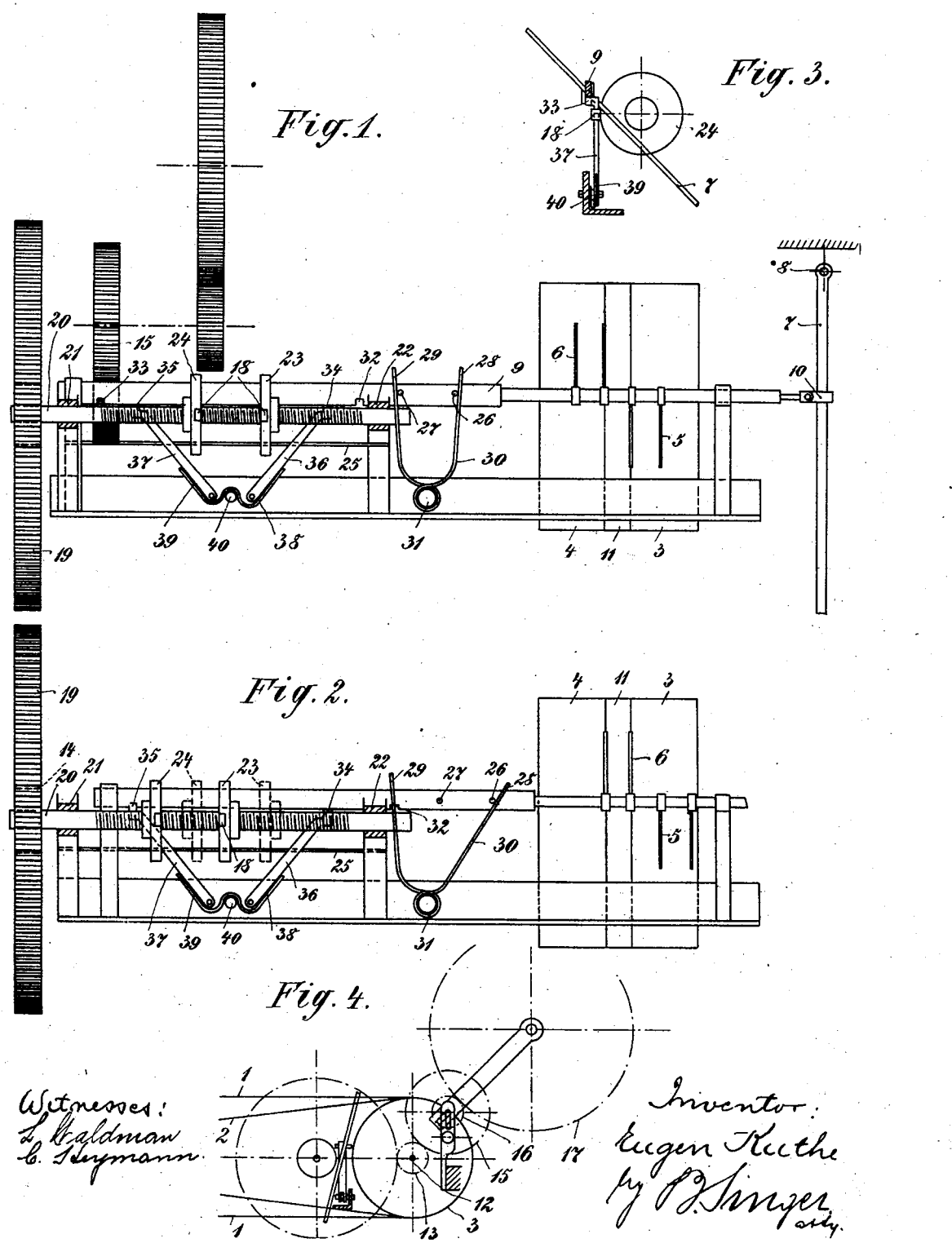

UNITED STATES PATENT OFFICE.

EUGEN KUTHE, OF FRÖBELN, GERMANY, ASSIGNOR TO FRÄMBS AND FREUDENBERG, OF SCHWEIDNITZ, GERMANY.

BELT-SHIFTER.

SPECIFICATION forming part of Letters Patent No. 755,678, dated March 29, 1904.

Application filed July 15, 1903. Serial No. 165,627. (No model.)

*To all whom it may concern:*

Be it known that I, EUGEN KUTHE, a subject of the Emperor of Germany, and a resident of Fröbeln, Silesia, Germany, have invented certain new and useful Improvements in Belt-Shifters, of which the following is a specification.

This invention relates more particularly to means whereby a belt or pair of belts may be automatically shifted at the end of a predetermined interval. Its objects are to provide a device of this character that will operate at the desired time entirely independent of the operator or workman and that will be capable of adjustment to regulate the time at which the belt will be shifted. I attain these objects by means of the mechanism shown in the accompanying drawings, in which—

Figure 1 is a front view of an apparatus embodying this invention, shown with the belt-shifter in inoperative position. Fig. 2 is a similar view showing the apparatus in operative position with the shift-bar about to be tripped. Fig. 3 is a diagrammatical end view of the apparatus, and Fig. 4 is a similar view taken through Fig. 2.

In the apparatus shown in the drawings the belt-shifter is adapted to operate in connection with a shaft turning in either direction. The straight belt 1 and cross-belt 2 pass around loose pulleys 3 and 4 and may be shifted by forks 5 and 6, so that either one will engage a tight pulley 11 in the well-known manner. The forks 5 and 6 are secured to a shift-bar 9, operating in suitable bearings and connected at 10 to a lever 7, pivoted at 8, by means of which it may be shifted to bring either of the belts onto the tight pulley 11. The pulleys are arranged on a shaft 12, Fig. 3, on which are also mounted gears 13 and 14, Fig. 1. The gear 13 meshes with a gear 15, which is mounted on a shaft with a gear 16. The latter gear meshes with a gear 17, which actuates the mechanism or machine to be driven. The gear 14 meshes with a gear 19, mounted on a shaft 20, secured in bearings 21 and 22. This shaft is screw-threaded between the bearings and carries a pair of threaded disks 23 and 24, which are adapted to be reciprocated thereby and are prevented from turning by means of a rod 25. On the shift-bar 9 are two pins 26 and 27, which are adapted to engage the upstanding arms 28 and 29 of the strong spring 30, which is fixed to the framework at 31.

The lower edge of the shift-bar 9 is provided with notches 32 and 33, which engage, respectively, with the ends 34 and 35 of pivoted arms or pawls 36 and 37 when the bar is shifted to its extreme positions. The arms 36 and 37 are pressed upward against the shift-bar 9 by the ends 38 and 39 of a spring which is secured at 40 to the frame. The disks 23 and 24 have lateral projections 18, which engage the arms 36 and 37 to depress the ends sufficiently to disengage them from the notches in the shift-bar 9.

The operation of this apparatus is as follows: When the lever 7 is thrown to the right, the shift-bar is brought to the position shown in Fig. 2 with the belt-fork 6 opposite the tight pulley. The spring-arm 30 is also flexed by the pin 26. The mechanism now being in operation through the belt-pulley 11, the train of gears above described will turn the shaft 20 and cause the disks 23 and 24 to be moved to the left until the projection 18 on the disk 24 strikes the arm 37 and depresses it sufficiently to free the shift-bar 9. The spring 30, acting against the pin 26, will instantaneously throw the bar 9 and bring the belts to register with the loose pulleys. The mechanism will consequently be stopped, and to start it again the operator throws the lever 7 to the left, which causes the reversely-moving belt to engage the pulley 11 and drive the mechanism in the opposite direction. The shift-bar 9 will now be engaged by the arm 36 and held in position until the opposite disk again releases the arm.

It will be observed that by moving the rod 25 and adjusting the disks 23 and 24 the time at which the shift-bar will be released can be accurately determined. It will also be noted that in case it is desired to only drive the mechanism in one direction a part of the shifting mechanism may be dispensed with; but it will be necessary to return the disk to its initial position by auxiliary means.

Having thus described my invention, what I claim, and desire to secure by Letters Patent, is—

In a belt-shifter, the combination of a main shaft, a wheel driven from said main shaft, a shaft provided with screw-threads driven by said wheel, adjustable disks on said shaft, a rod engaging said disks to prevent them from turning, a slidable shift-bar, belt-forks on said bar, notches in said bar, spring-pressed pawls, one of which is adapted to engage with one of said notches when the bar is at the end of its movement, projections on said disk for engaging said pawls to release the latter from the bar, a spring, pins on said bar adapted to engage the ends of said spring whereby the latter may shift the bar when the engaged pawl is released, substantially as described.

In testimony whereof I have affixed my signature in presence of two witnesses.

EUGEN KUTHE.

Witnesses:
 WILHELM SCHATZ,
 BRUNO CLAASSEN.